(12) United States Patent
Lin et al.

(10) Patent No.: US 9,391,940 B2
(45) Date of Patent: Jul. 12, 2016

(54) TYPING INDICATOR FOR IMAP MESSAGING

(71) Applicant: Cellco Partnership, Basking Ridge, NJ (US)

(72) Inventors: Zhijian Lin, Dublin, CA (US); Fred Bierhaus, Piedmont, CA (US); Jerry M. Kupsh, Concord, CA (US)

(73) Assignee: Cellco Partnership, Basking Ridge, NJ (US)

( * ) Notice: Subject to any disclaimer, the term of this patent is extended or adjusted under 35 U.S.C. 154(b) by 483 days.

(21) Appl. No.: 13/926,112

(22) Filed: Jun. 25, 2013

(65) Prior Publication Data

US 2014/0379816 A1    Dec. 25, 2014

(51) Int. Cl.
*G06F 15/16*    (2006.01)
*H04L 12/58*    (2006.01)

(52) U.S. Cl.
CPC .............. *H04L 51/24* (2013.01); *H04L 12/589* (2013.01)

(58) Field of Classification Search
CPC .............................. H04L 12/589; H04L 12/58
USPC .................................................... 709/204, 206
See application file for complete search history.

(56) References Cited

U.S. PATENT DOCUMENTS 8,626,841 B2 *  1/2014  Gorty et al. ................... 709/206
2010/0169406 A1 *  7/2010  Gregg .......................... 709/203

* cited by examiner

*Primary Examiner* — Adnan Mirza (57) ABSTRACT

A message server may establish an internet message access protocol ("IMAP") IDLE session with a first client device. The IMAP IDLE session may be used to transmit one or more notifications to the first client device. The message server may determine a status notification associated with a second client device. The status notification may include information associated with an action being performed using the second client device. The message server may determine that the first client device is an intended recipient of the status notification. The message server may transmit the status notification, toward the first client device, via the IMAP IDLE session, based on determining that the first client device is the intended recipient of the status notification.

20 Claims, 9 Drawing Sheets

TYPING INDICATOR FOR IMAP MESSAGING

BACKGROUND

Internet message access protocol ("IMAP") is an internet protocol that allows an e-mail client to access e-mail stored on a remote mail server. IMAP may include an IDLE feature that may be used to allow the e-mail client device to alert the mail server that the e-mail client is available to receive notifications.

DETAILED DESCRIPTION

The following detailed description of example implementations refers to the accompanying drawings. The same reference numbers in different drawings may identify the same or similar elements.

Integrated messaging may be used for allowing client devices to send and receive messages, such as short message system ("SMS") messages and multimedia messaging system ("MMS") messages. Integrated messaging may be implemented by using an IMAP application layer protocol, such as used by a server supporting IMAP messaging. Multiple client devices may be connected via the IMAP application layer protocol in order to facilitate integrating messaging between the users. The IMAP application layer protocol may include a customized library which may include features such as IMAP IDLE. The IMAP IDLE command may be used to allow client devices to communicate with a server in order to be alerted to notifications from the server relating to messages or message status. However, IMAP IDLE does not support a status notification identifying an action being performed on a device, such as a typing indicator. Implementations described herein may utilize a server integrating a customized IMAP command to provide status notifications between client devices.

Figure 1:
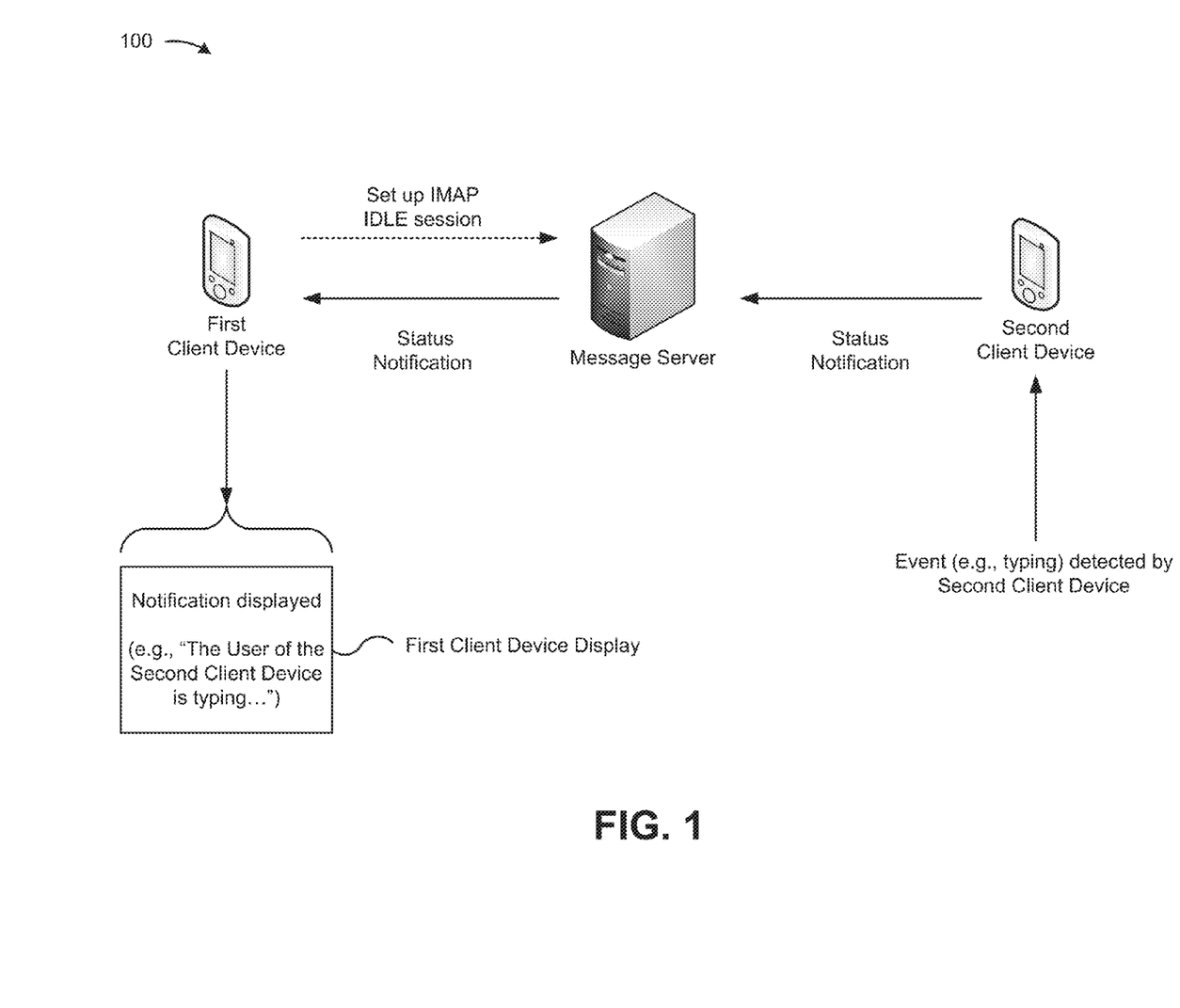
FIG. 1 is a diagram of an overview of an example implementation described herein.

FIG. 1 is a diagram of an overview of an example implementation 100 described herein. As shown in FIG. 1, example implementation 100 may include a first client device, a message server, and a second client device. For example, the first client device may include a first mobile phone, the message server may include a server implementing a customized IMAP library, and the second client device may include a second mobile phone.

As shown in FIG. 1, the message server may set up an IMAP IDLE session with the first client device. For example, the message server may receive an IMAP IDLE command from the first client device, indicating that the first client device is ready to accept status notifications. The message server may then receive a status notification from the second client device. The status notification may include information identifying a message sender (e.g., identifying the second client device), a message recipient (e.g., identifying the first client device), and a notification (e.g., that a user associated with the second client device is typing a message intended for the first client device).

As further shown in FIG. 1, the message server may transmit the status notification to the first client device via the IMAP IDLE session based on the information identifying the first client device as the message recipient. The first client device may utilize the received status notification to provide feedback to a user, such as by displaying a notification that "the user of the second client device is typing …." In this way, status notifications associated with the second user device may be transmitted to a first user device using the IMAP application layer protocol.

Figure 2:
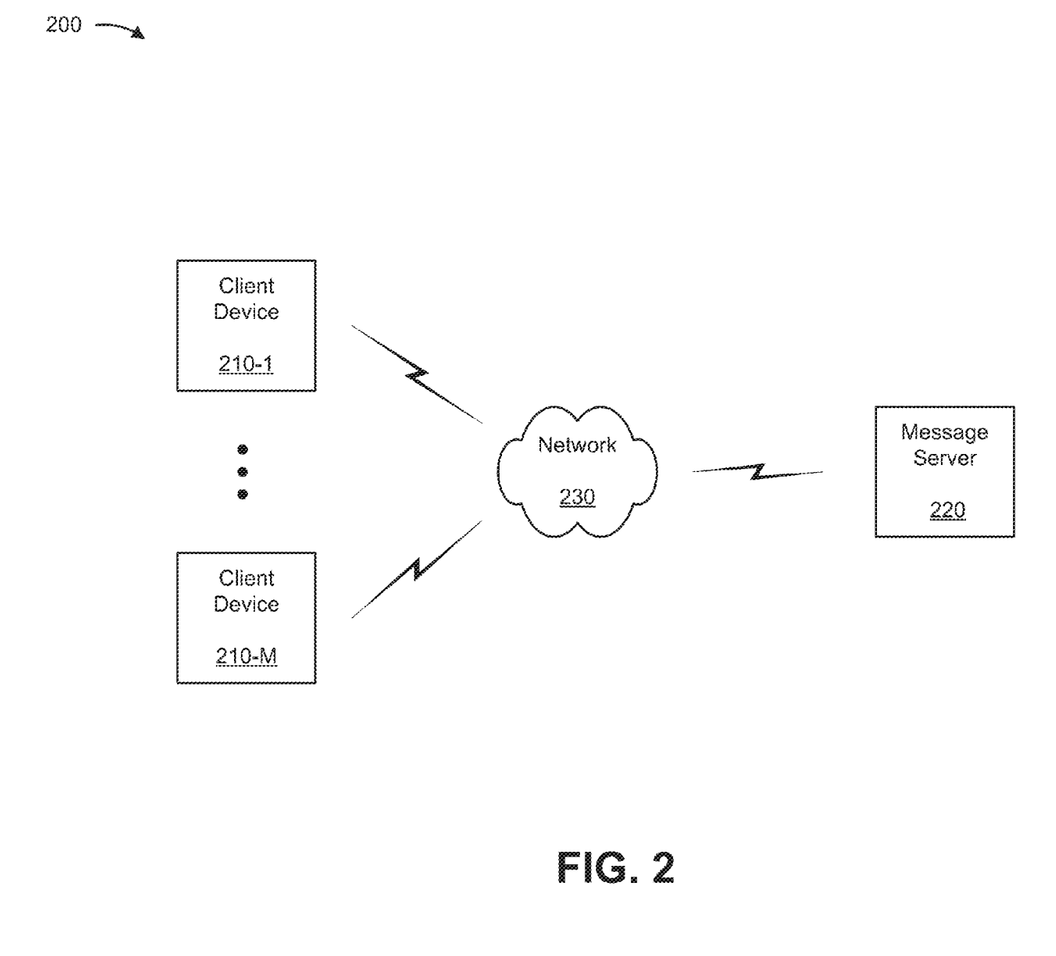
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client devices 210-1 through 210-M (M≥2) (hereinafter referred to collectively as "client devices 210," and individually as "client device 210"), a message server 220, and a network 230. Devices of environment 200 may interconnect via wired connections, wireless connections, or a combination of wired and wireless connections.

Client device 210 may include one or more devices capable of receiving, generating, processing, storing, and/or transmitting network traffic, such as media, audio, video, text, and/or other traffic, to another client device 210. For example, client device 210 may include a mobile phone (e.g., a smart phone), a radiotelephone, a personal communications system ("PCS") terminal (e.g., that may combine a cellular radiotelephone with data processing and data communications capabilities), a personal digital assistant ("PDA") (e.g., that may include a radiotelephone, a pager, Internet/intranet access, etc.), a computer (e.g., a desktop computer, a laptop computer, a tablet computer, etc.), a personal gaming system, a network device, and/or another similar type of device.

Client device 210 may include an interface with another device, in some implementations. For example, a device that lacks IMAP support may connect to a virtual client interface (e.g., via a website) to utilize IMAP messaging. In this case, the interface may be a virtual implementation of client device 210. In some implementations, client device 210 may be capable of establishing an IMAP IDLE session with message server 220 (e.g., via network 230). In some implementations, client device 210 may send status notifications to message server 220 (e.g., via network 230).

Message server 220 may include one or more devices capable of communicating with client device 210 (e.g., via an IMAP application layer protocol). For example, message server 220 may include a network device, such as a server, a router, a gateway, a hub, a bridge, a switch, or the like. In some implementations, message server 220 may include a data structure that stores of client device identifiers (e.g., phone numbers, mobile device identifiers, Universal Resource Indicators (URIs), Universal Resource Locators (URLs), Internet Protocol ("IP") addresses, etc.) and corresponding mailbox identifiers (mailbox IDs) associated with each of the client device identifiers. A mailbox ID may identify a mailbox used for storing messages for a corresponding client device identifier. In some implementations, message server 220 may be capable of establishing an IMAP IDLE session with one or more client devices 210. Message server 220 may receive a status notification from a first client device 210 via a first network 230, and may transmit, using an IMAP IDLE session, the status notification to a second client device 210 via a second network 230.

Network 230 may include one or more wired and/or wireless networks. For example, network 230 may include a cellular network, a public land mobile network ("PLMN"), a first generation ("1G") network, a second generation ("2G") network, a third generation ("3G") network, a fourth generation ("4G") network, a fifth generation ("5G") network, a one times transmission ("1x") network, a code division multiple access ("CDMA") network, a long term evolution ("LTE") network, and/or another network. Additionally, or alternatively, network 230 may include a Wi-Fi network, a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
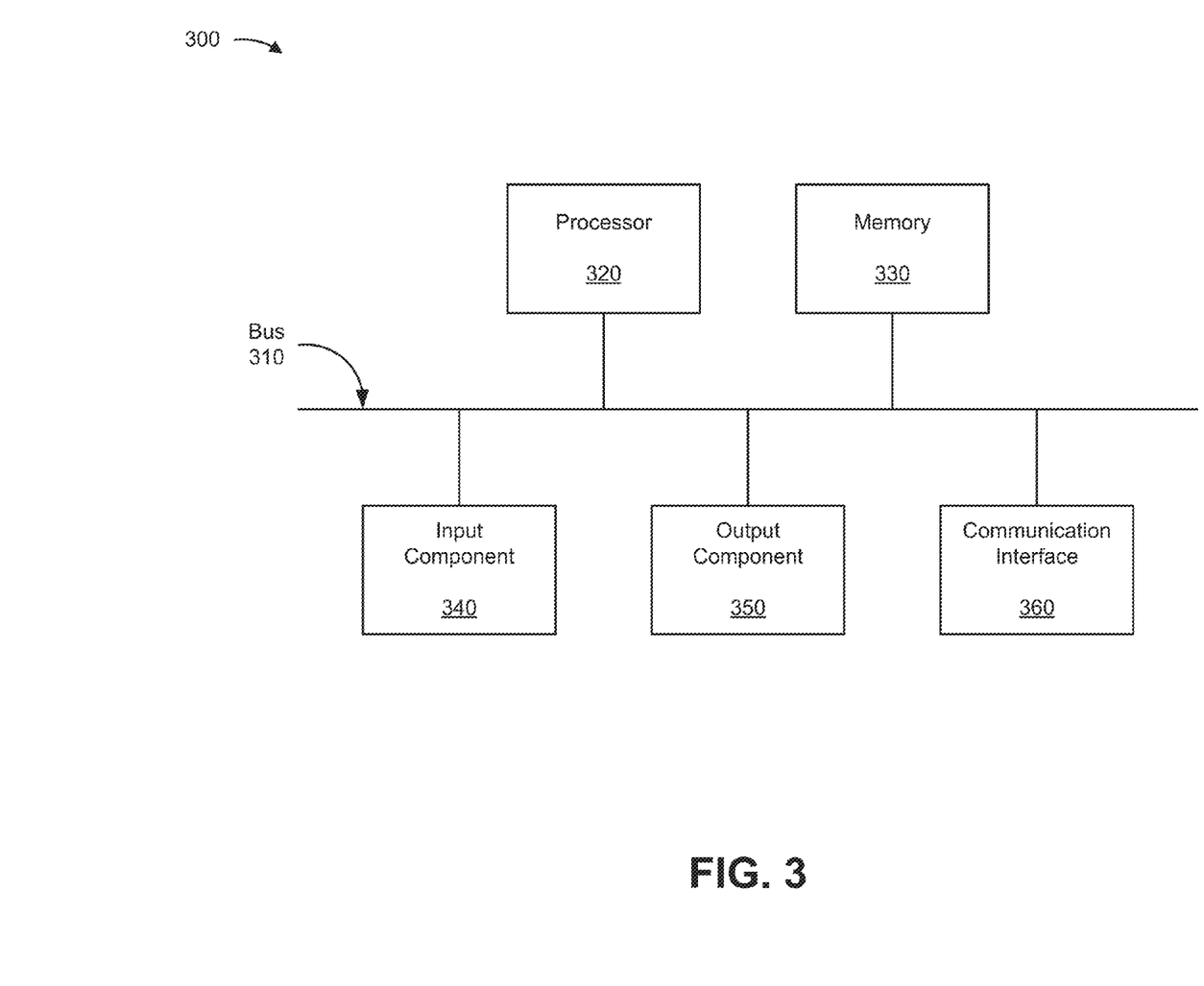
FIG. 3 is a diagram of example components of one or more devices of FIG. 2.

FIG. 3 is a diagram of example components of a device 300. Device 300 may correspond to client device 210 and/or message server 220. Additionally, or alternatively, each of client device 210 and/or message server 220 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, a Wi-Fi interface, a cellular network interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
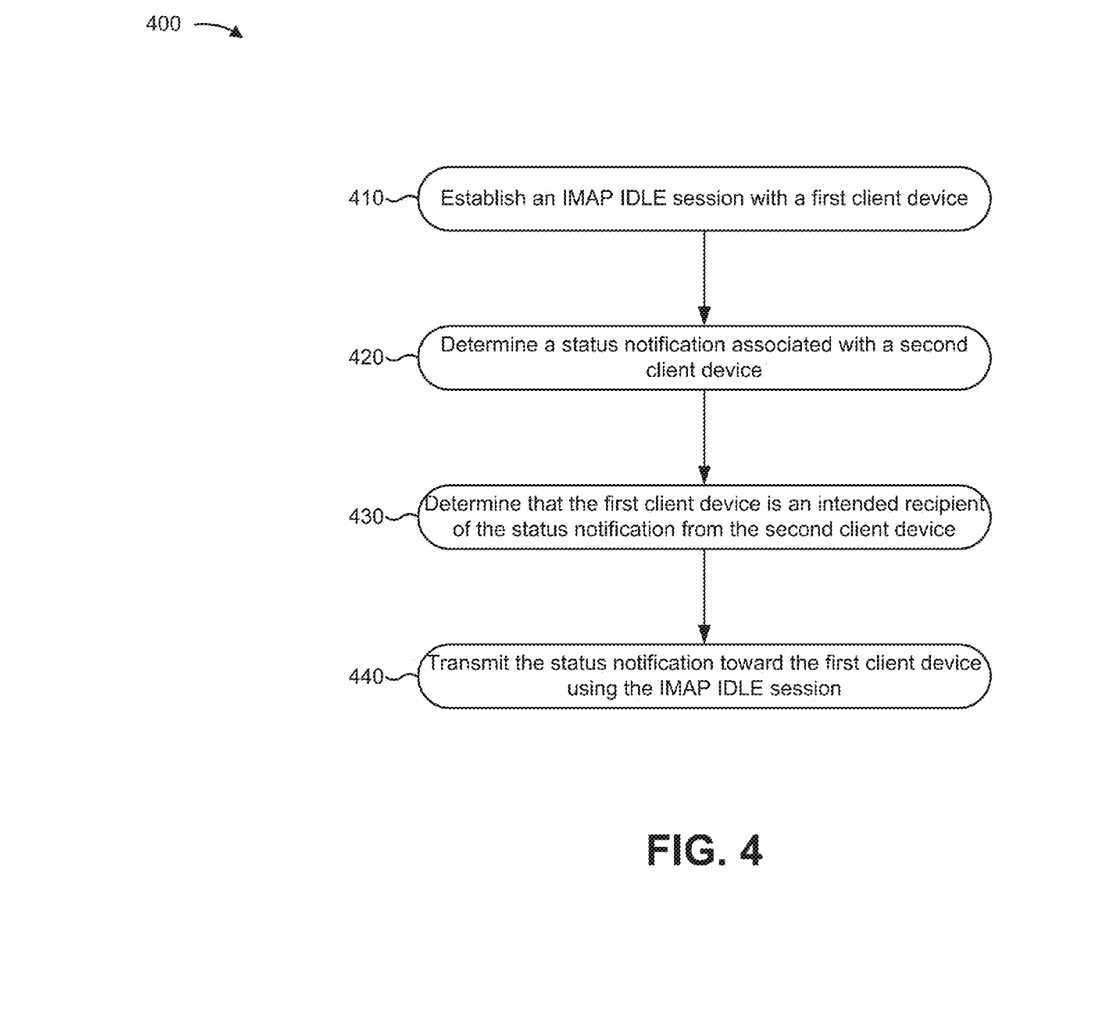
FIG. 4 is a flow chart of an example process for transmitting status notifications using an IMAP IDLE session.

FIG. 4 is a flow chart of an example process 400 for transmitting status notifications using an IMAP IDLE session. In some implementations, one or more process blocks of FIG. 4 may be performed by message server 220. Additionally, or alternatively, one or more process blocks of FIG. 4 may be performed by another device or a group of devices separate from or including message server 220, such as client device 210.

As shown in FIG. 4, process 400 may include establishing an IMAP IDLE session with a first client device (block 410). For example, message server 220 may establish an IMAP IDLE session with client device 210. Client device 210 may request an IMAP IDLE session, in some implementations. For example, client device 210 may send, to message server 220 via network 230, a request for an IMAP IDLE session to be established by message server 220, such as by sending an IDLE command to message server 220. The IDLE command may indicate that client device 210 is available to accept notifications (e.g., status notifications) from message server 220.

Additionally, or alternatively, message server 220 may determine to establish an IMAP IDLE session with client device 210. For example, message server 220 may determine that a first client device 210 is actively communicating with a second client device 210, and may establish an IMAP IDLE session with the first client device 210 to facilitate transmission of status notifications, as described herein, from the second client device 210. In some implementations, a sending client device 210 may request that message server 220 establish an IMAP IDLE session for a recipient client device 210. For example, the sending client device 210 may send a status notification to the recipient client device 210, and message server 220 may establish an IMAP IDLE session with the recipient client device 210 to facilitate transmission of the status notification. The status notification, as described herein, may indicate an action being performed using the second client device 210, such as typing a message (e.g., an email message, an SMS message, an MMS message, etc.), waiting while a message is typed but unsent (e.g., idle), uploading a file, taking a photograph, recording a video, editing a shared message, displaying a message, displaying a video, displaying a photograph, playing an audio file, recording audio, or the like.

Message server 220 may receive information identifying a client device 210 associated with sending and/or receiving status notifications via an IMAP IDLE session, in some implementations. For example, message server 220 may receive information associated with a messaging profile of client device 210, such as a telephone number, an email address, or like. In some implementations, message server 220 may receive information identifying another client device 210 from which client device 210 may receive a status notification. For example, message server 220 may determine that a first client device 210 is to receive a status notification from a second client device 210, but is not to receive a status notification from a third client device 210. In some implementations, message server 220 may receive information associated with active communications between client device 210 and another client device 210. For example, message server 220 may determine that a first client device 210 is actively communicating with a second client device 210, and may use this information in routing status notifications.

In some implementations, message server 220 may establish the IMAP IDLE session for a particular status notification type. A status notification type, as used herein, may refer to a notification associated with a particular type of action being performed using client device 210, such as a typing indicator, a file transfer indicator, or the like. For example, a request to establish the IMAP IDLE session may include information identifying an acceptable status notification type. In this case, message server 220 may determine whether a received status notification matches the acceptable status notification type, and may transmit the received status notification to client device 210, accordingly.

As shown in FIG. 4, process 400 may include determining a status notification associated with a second client device (block 420). For example, message server 220 may receive the status notification from second client device 210 via network 230. In some implementations second client device 210 may include software that monitors actions (e.g., user actions), performed using second client device 210, that relate to a communication with first client device 210. For example, client device 210 may detect, and message server 220 may receive, a status notification indicating that client device 210 is being used for performing an action relating to the communication with first client device 210. In this case, message server 220 may receive an IMAP XTYPE command that includes the status notification. The status notification may indicate an action being performed using a second client device 210 as the action relates to a communication with the first client device 210. For example, the status notification may indicate an action being performed using the second client device 210.

Message server 220 may receive the status notification as an IMAP XTYPE command, in some implementations. An IMAP XTYPE command, as used herein, may refer to an IMAP command that includes a status notification (e.g., indicating an action being performed using client device 210, such as typing a message). In some implementations, message server 220 may detect that a command, received from second client device 210, is an IMAP XTYPE command, and may determine that the command includes a status notification.

Message server 220 may determine a status notification based on an action being performed using client device 210, in some implementations. For example, message server 220 may determine that a client device 210 is being used for typing a message (e.g., an e-mail, an SMS, an MMS, etc.) to another client device 210. In this case, message server 220 may generate a status notification for client device 210 (e.g., "The user of client device 210 is typing . . . "). In some implementations, message server 220 may generate an IMAP XTYPE command based on generating the status notification. For example, message server 220 may generate an IMAP XTYPE command to transmit the status notification to the other client device 210.

Message server 220 may generate a status notification based on determining that a client device 210 is uploading a file, in some implementations. For example, a first client device 210 may upload a file to message server 220 as part of an e-mail. In this case, message server 220 may determine another client device 210 to be the recipient of the email, and may generate a status notification to be sent to the other client device 210 (e.g., "The user of the first client device 210 is uploading a file").

The status notification may be associated with an SMS message, an MMS message, an electronic mail ("e-mail") message, a file transfer protocol ("FTP") transfer, a voice message, or the like, in some implementations. For example, the status notification may include information indicating that the second client device 210 is being used to type an SMS message, record a voice message, send an FTP file, watch a sent video message, edit a shared file, or the like.

The status notification may include information identifying an idle time associated with the status notification, in some implementations. An idle time, as used herein, may refer to a period of time after which the status notification is to be considered out-of-date. For example, message server 220 may determine that the idle time has elapsed, and may cause the status notification to be removed by client device 210. Additionally, or alternatively, client device 210 may determine that the idle time has elapsed, and may remove the status notification. In some implementations, message server 220 may determine the quantity of time elapsed to be less than the idle time, and may decrease the idle time, accordingly, before transmitting the status notification. In some implementations, the status notification may include information associated with determining how often to retransmit the status notification. For example, client device 210 may include instructions within the status notification indicating that when the idle time elapses, message server 220 is to re-transmit the status notification until client device 210 sends a new status notification. Additionally, or alternatively, client device 210 may determine to retransmit the status notification based on the idle time and determining that client device 210 is still being used to perform an action.

As shown in FIG. 4, process 400 may include determining that the first client device is an intended recipient of the status notification from the second client device (block 430). For example, message server 220 may determine that the status notification from the second client device 210 is intended for the first client device 210. The status notification may include information identifying a sending client device 210, in some implementations. For example, message server 220 may receive information identifying client device 210 (e.g., second client device 210) as a sender of the notification.

The status notification may include information identifying a recipient client device 210, in some implementations. For example, message server 220 may receive information identifying client device 210 (e.g., first client device 210) as a recipient of the status notification. In some implementations, message server 220 may determine multiple recipient client devices 210 for a single status notification. For example, message server 220 may determine that a first client device 210, a second client device 210, and a third client device 210 are to be transmitted the same status notification (e.g., via IMAP IDLE sessions individually associated with each of the recipient client devices 210).

The status notification may include information identifying a communication thread associated with the notification, in some implementations. For example, a recipient client device 210 may be actively engaged in a first SMS communication with a first sending client device 210 and a second SMS communication with a second sending client device 210. In this case, message server 220 may receive information associated with determining to which communication the status notification pertains (e.g., in which communication thread is the typing indicator to appear). In some implementations, message server 220 may include information associated with determining to which communication the status notification pertains when transmitting the status notification. For example, message server 220 may determine the status notification to pertain to the first SMS communication, and may include information instructing the recipient client device 210 to associate the status notification with the first SMS communication.

As shown in FIG. 4, process 400 may include transmitting the status notification toward the first client device using the IMAP IDLE session (block 440). For example, message server 220 may transmit the status notification (e.g., as an IMAP XTYPE command), via network 230, to client device 210 using the IMAP IDLE session. In some implementations, message server 220 may transmit the status notification to multiple client devices 210 (e.g., sequentially or concurrently).

The transmission of the status notification may cause recipient client device 210 to display the status notification and/or information associated with the status notification, in some implementations. For example, the transmission of the status notification may cause recipient client device 210 to display information associated with an action being performed on sending client device 210, such as typing a message. Additionally, or alternatively, the transmission of the status notification may cause recipient client device 210 to emit an audible sound, display a flashing light, vibrate, or the like. In some implementations, transmission of the status notification may cause recipient client device 210 to remove a previous status notification. For example, based on receiving a new status notification from message server 220, recipient client device 210 may discard an old status notification.

In some implementations, message server 220 may determine that an idle time associated with the status notification has elapsed, and may cause the status notification not to be displayed. For example, message server 220 may discard the status notification. Additionally, or alternatively, message server 220 may cause client device 210 to discard the status notification when the idle time has elapsed. In some implementations, message server 220 may send information that identifies the idle time to recipient client device 210, and recipient client device 210 may update information on a display when the idle time has elapsed.

Message server 220 may provide feedback to a sending client device 210 as to whether the status notification intended for a recipient client device 210 was transmitted successfully. For example, message server 220 may send an alert to sending client device 210, indicating that a status notification was not successfully transmitted to recipient client device 210. In some implementations, the alert may indicate the reason that the status notification was not successfully transmitted. For example, message server 220 may indicate that recipient client device 210 did not set up an IMAP IDLE session. Alternatively, message server 220 may indicate that recipient client device 210 was rejecting status notifications of a particular type and/or from a particular sending client device 210.

In this way, message server 220 may facilitate transmission of status notifications using an IMAP IDLE session.

Although FIG. 4 shows example blocks of process 400, in some implementations, process 400 may include additional blocks, different blocks, fewer blocks, or differently arranged blocks than those depicted in FIG. 4. Further, one or more of the blocks of process 400 may be omitted in some implementations. Additionally, or alternatively, one or more of the blocks of process 400 may be performed in parallel.

Figure 5:
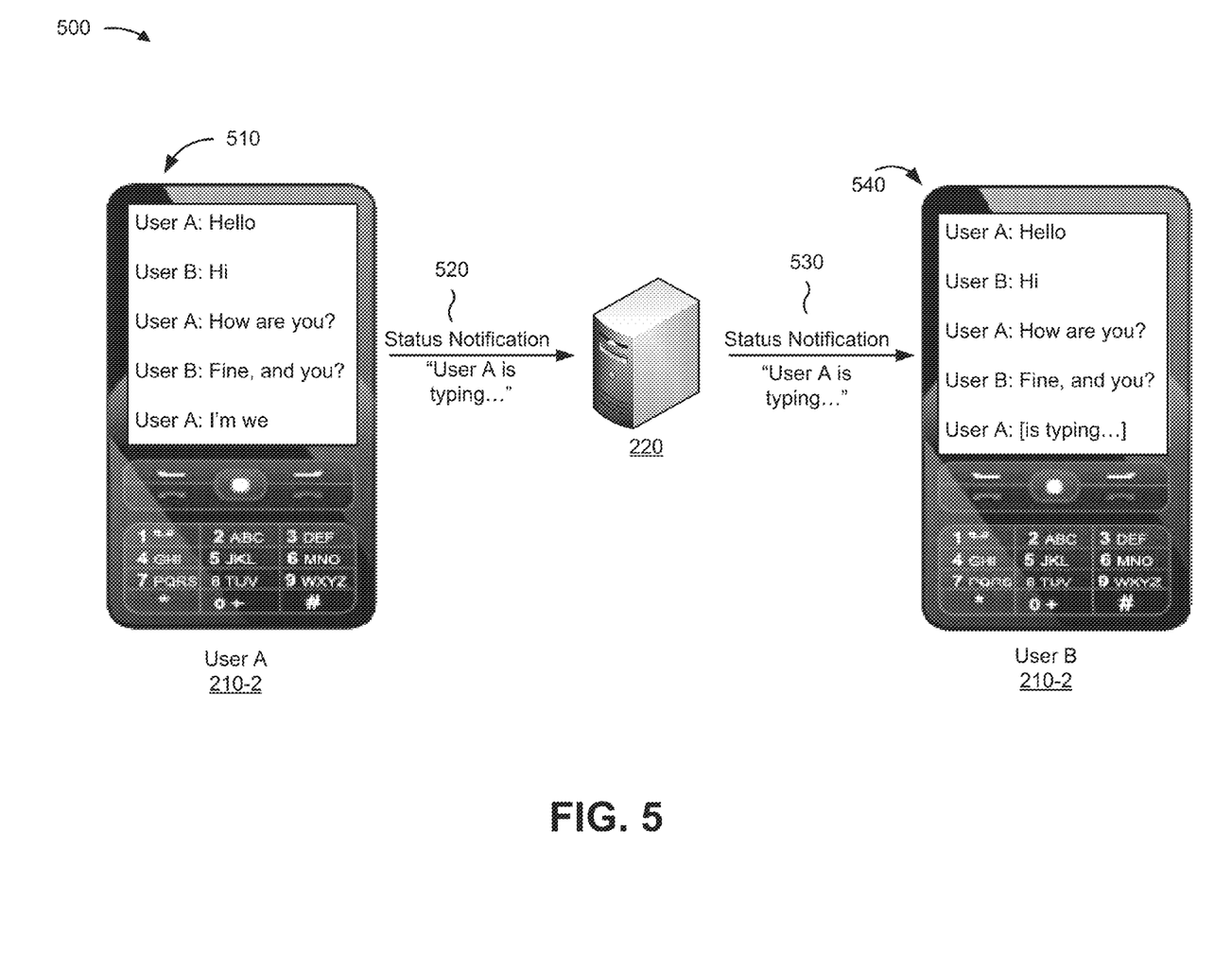
FIG. 5 is a diagram of an example implementation relating to the example process shown in FIG. 4.

FIG. 5 is a diagram of an example implementation 500 relating to process 400 shown in FIG. 4. As shown in FIG. 5, example implementation 500 may include a client device 210-1, being used by User A, a client device 210-2, being used by User B, and a message server 220. Assume that client device 210-2 has established an IMAP IDLE session with message server 220.

As shown by reference number 510, assume that User A is typing a message to User B (e.g., "I'm well . . . "). Client device 210-1 generates a status notification that identifies an action being performed using client device 210-1 associated with a communication intended for client device 210-2 (e.g., "User A is typing . . . "). As shown by reference number 520, the status notification may be received by message server 220. As shown by reference number 530, message server 220 may provide the status notification to client device 210-2, via the IMAP IDLE session. As shown by reference number 540, client device 210-2 receives the status notification, and may display the information identified by the status notification (e.g., "User A is typing").

As indicated above, FIG. 5 is provided merely as an example. Other examples are possible and may differ from what was described with regard to FIG. 5.

Figure 6:
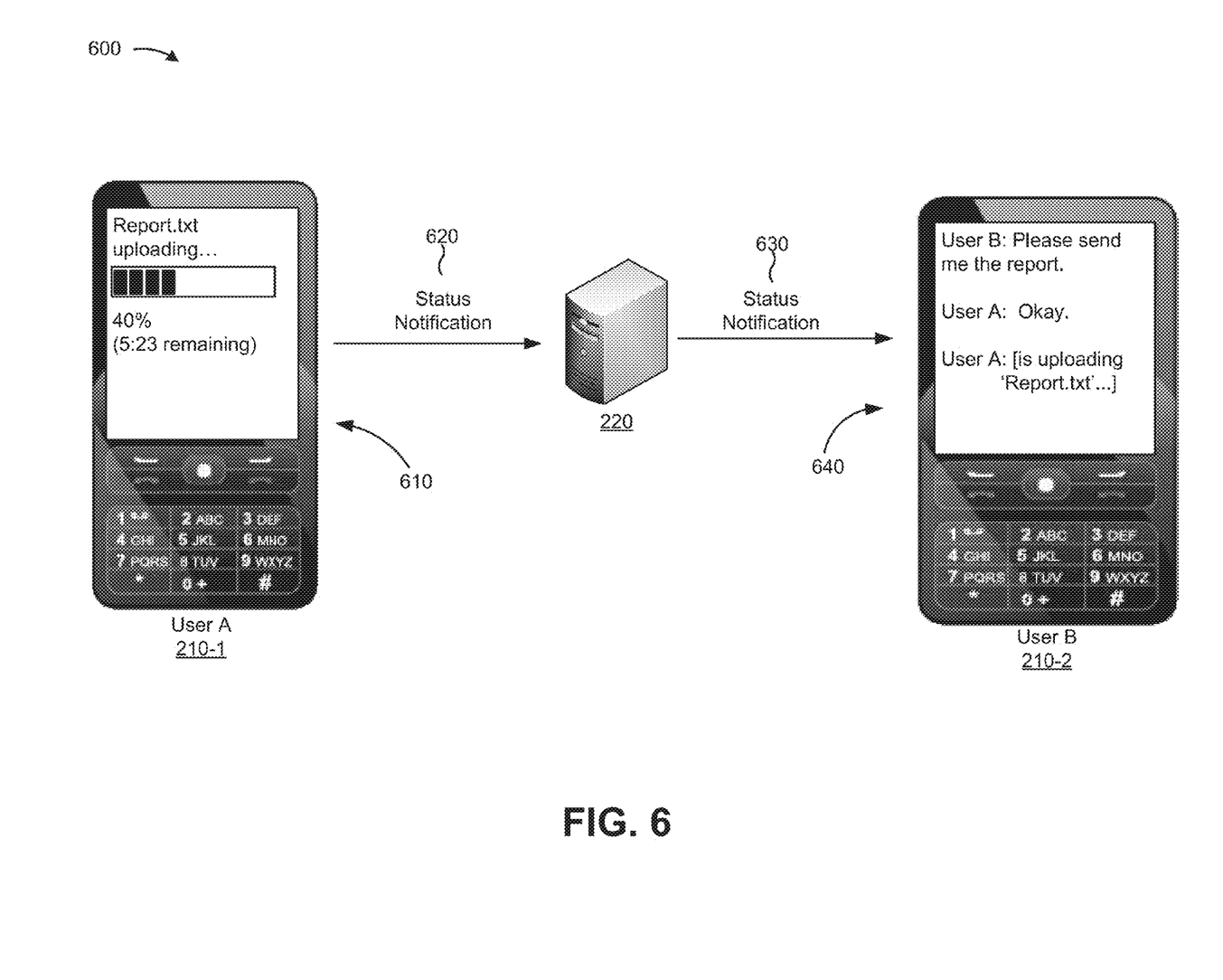
FIG. 6 is a diagram of another example implementation relating to the example process shown in FIG. 4.

FIG. 6 is a diagram of an example implementation 600 relating to process 400 shown in FIG. 4. As shown in FIG. 6, example implementation 600 may include a client device 210-1, being used by User A, a client device 210-2, being used by User B, and a message server 220. Assume that client device 210-2 has established an IMAP IDLE session with message server 220.

As shown by reference number 610, assume that User A is uploading a file (e.g., "Report.txt") to a server, such as message server 220. Client device 210-1 generates a status notification that indicates an action being performed using client device 210-1 (e.g., "User A is uploading 'Report.txt' . . . ").

As shown by reference number 620, client device 210-1 transmits the status notification to message server 220. Message server 220 transmits the status notification to client device 210-2, as shown by reference number 630. Client device 210-2 may display information that identifies the action indicated in the status notification (e.g., "User A is uploading 'Report.txt.' . . . "), as shown by reference number 640.

As indicated above, FIG. 6 is provided merely as an example. Other examples are possible and may differ from what was described with regard to FIG. 6.

Figure 7:
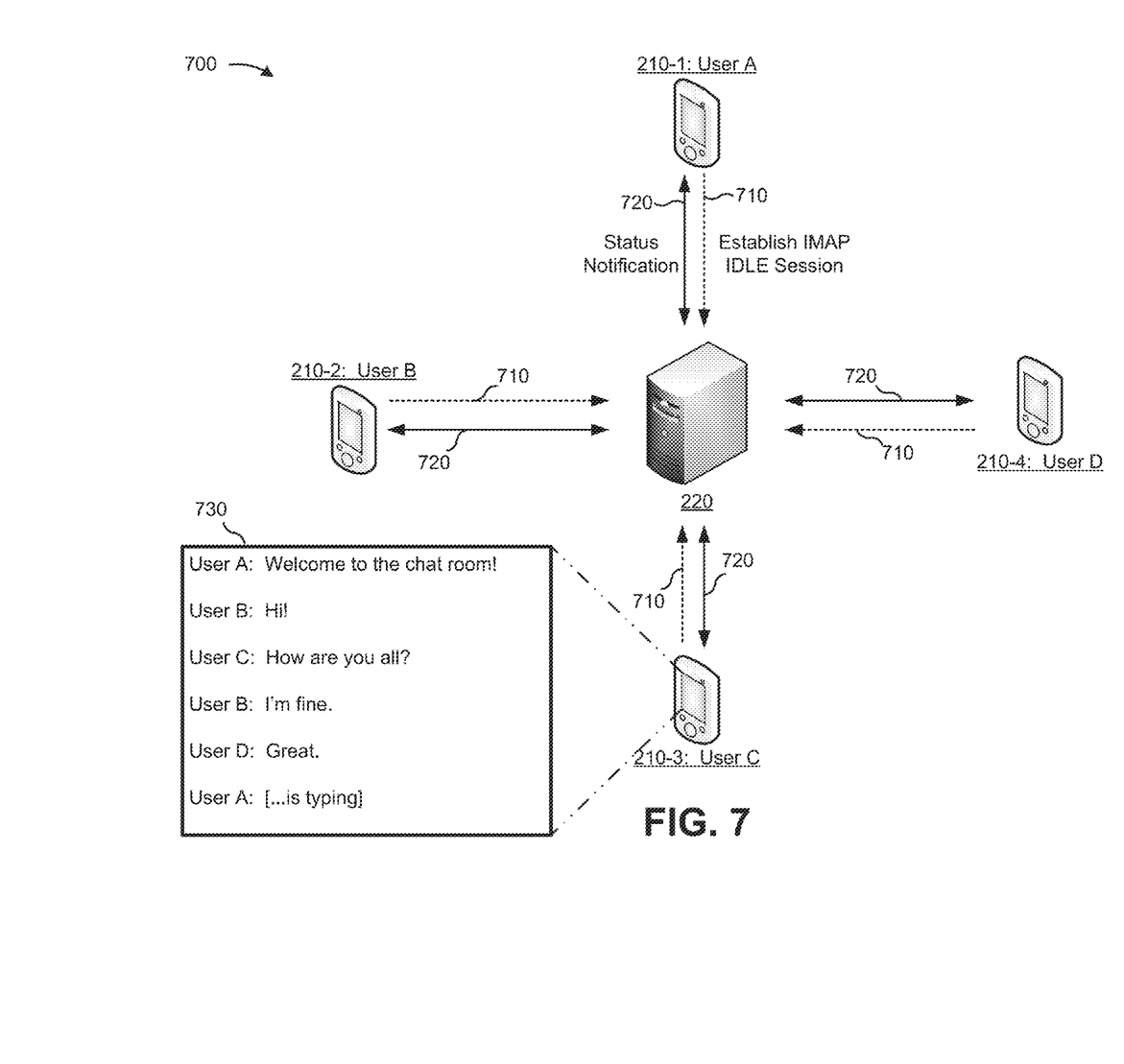
FIG. 7 is a diagram of another example implementation relating to the example process shown in FIG. 4.

FIG. 7 is a diagram of an example implementation 700 relating to process 400 shown in FIG. 4. As shown in FIG. 7, example implementation 700 may include a client device 210-1, being used by User A; a client device 210-2, being used by User B; a client device 210-3, being used by User C; a client device 210-4, being used by User D; and a message server 220.

As shown by reference number 710, client device 210-1, client device 210-2, client device 210-3, and client device 210-4 have each established an IMAP IDLE session with message server 220. As shown by reference number 720, client device 210-1, client device 210-2, client device 210-3, and client device 210-4 may each send status notifications, at appropriate times, to message server 220 to be sent to each other client device 210, and may each receive status notifications from message server 220 having been sent by each other client device 210.

As further shown in FIG. 7, assume that reference number 730 shows an example of a display screen for client device 210-3 (e.g., a group chat of User A, User B, User C, and User D, as seen by User C). Further assume that User A is typing a message to User B, User C, and User D. Client device 210-1 generates a status notification that is received by message server 220, as shown by reference number 720. Message server 220 transmits the status notification to client device 210-2, client device 210-3, and client device 210-4, as further shown by reference number 720. Client device 210-3, as well as client device 210-1 and client device 210-4, displays an indicator of the action being performed using client device 210-1 (e.g., "User A is typing"), as shown in reference number 730.

As indicated above, FIG. 7 is provided merely as an example. Other examples are possible and may differ from what was described with regard to FIG. 7.

Figure 8:
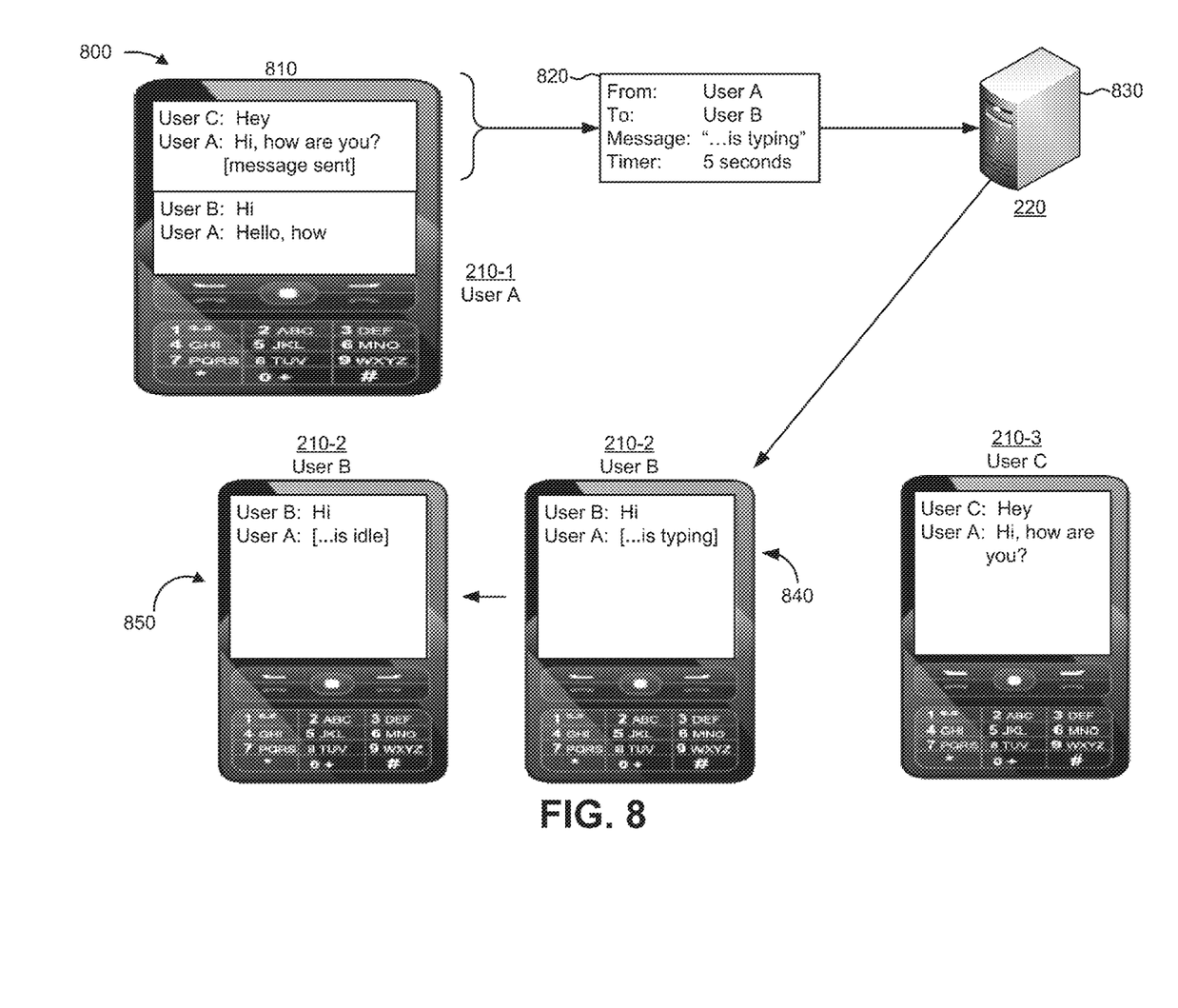
FIG. 8 is a diagram of another example implementation relating to the example process shown in FIG. 4.

FIG. 8 is a diagram of an example implementation 800 relating to process 400 shown in FIG. 4. As shown in FIG. 8, example implementation 800 may include a client device 210-1, being used by a User A; a client device 210-2, being used by a User B; a client device 210-3, being used by a User C; and a message server 220.

As shown by reference number 810, User A is engaged in a first communication with User C and a second communication with User B. In the first communication, User A has finished typing a message (e.g., "Hi, how are you?") and the message has been sent. In the second communication, User A is typing a message to User B (e.g., "Hello, how . . . ").

As shown by reference number 820, a status notification includes an indicator of an action being performed by User A using client device 210-1 (e.g., " . . . is typing"). The status notification includes information identifying User A as the status notification sender, User B as the status notification recipient, and an idle time of 5 seconds.

As shown by reference number 830, message server 220 receives the status notification and, of the two communications associated with User A, determines the status notification is to be directed to client device 210-2.

As shown by reference number 840, client device 210-2 receives the status notification from message server 220, and may display the status notification for User B to view. As shown by reference number 850, after the idle time has elapsed, client device 210-2 removes the status notification as being out-of-date, and may await a new status notification. In this case, client device 210-2 replaces the status notification ("User A is typing") with a new status ("User A is idle"). This may indicate that message server 220 has not received a second status notification from client device 210-1 indicating that client device 210-1 is still being used for typing a message.

As indicated above, FIG. 8 is provided merely as an example. Other examples are possible and may differ from what was described with regard to FIG. 8.

Figure 9:
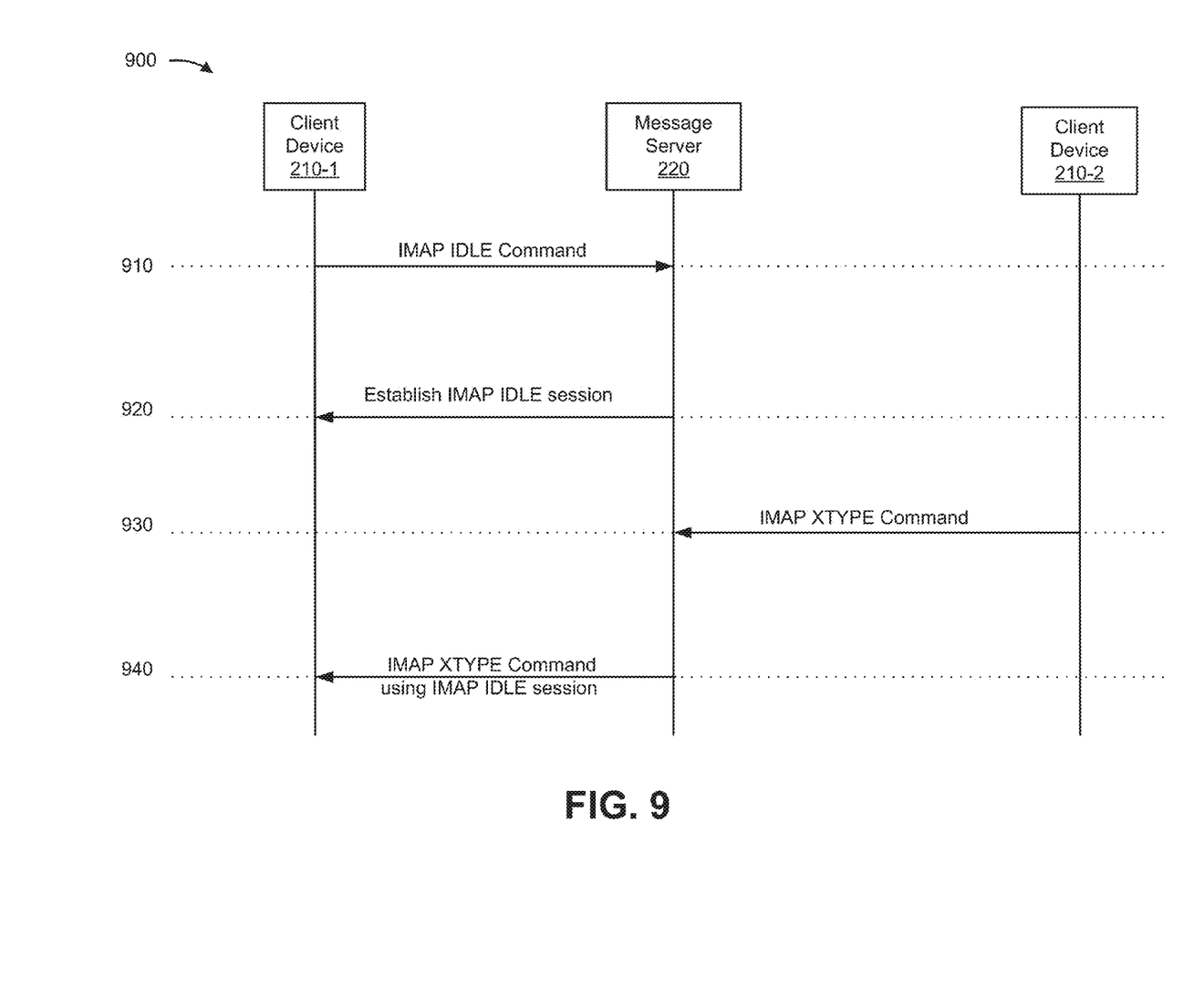
FIG. 9 is a diagram of an example call flow for transmitting status notifications using an IMAP IDLE session.

FIG. 9 is a diagram of an example call flow 900 for transmitting status notifications using an IMAP IDLE session.

As shown by reference number 910, call flow 900 may include transmitting, by a client device 210-1 and to a message server 220, an IMAP IDLE command. The IMAP IDLE command may include a request to establish an IMAP IDLE session over a first network 230.

As shown by reference number 920, call flow 900 may include establishing, by message server 220, an IMAP IDLE session with client device 210-1. In some implementations, establishing an IMAP IDLE session may include notifying, by message server 220, client device 210-1 that an IMAP IDLE session has been established.

As shown by reference number 930, call flow 900 may include transmitting, by a client device 210-2 and to message server 220, an IMAP XTYPE command indicating an action being performed using client device 210-2 (e.g., a status notification), via a second network 230. In some implementations, message server 220 may determine that the command transmitted from client device 210-2 is an IMAP XTYPE command. Additionally, or alternatively, message server 220 may identify client device 210-2 as the sender of the IMAP XTYPE command, and may identify client device 210-1 as an intended recipient of the IMAP XTYPE command.

In some implementations, message server 220 may determine an action identified by the command and/or by a status notification included in the command (e.g., a typing action, an uploading action, etc.). Additionally, or alternatively, message server 220 may determine whether to send a status notification and/or an IMAP XTYPE command to client device 210-1 (e.g., based on a type of the action, based on a type of status notification, based on identifying client device 210-2, etc.). Additionally, or alternatively, message server 220 may generate an IMAP XTYPE command, which may be the same as the received IMAP XTYPE command, may include additional information added to the received IMAP XTYPE command (e.g., message server 220 may add information that identifies an idle time), or may include less information than the received IMAP XTYPE command (e.g., message server 220 may remove information identifying client device 210-2).

As further shown by reference number 940, call flow 900 may include transmitting, by message server 220 and to client device 210-1, the IMAP XTYPE command using the IMAP IDLE session, via the first network 230. In some implementations, transmitting the IMAP XTYPE command to client device 210-1 may include determining whether to send the IMAP XTYPE command to client device 210-1. For example, message server may determine that the status notification type, associated the IMAP XTYPE command, matches a status notification type that client device 210-1 is to be transmitted.

In some implementations, the first network 230 and the second network 230 may be the same network. For example, client device 210-1 and client device 210-2 may both be smart phones connected to a first network 230. As another example, client device 210-1 may be a smart phone connected to the first network 230 and client device 210-2 may be a tablet computer connected to a second network 230.

As indicated above, FIG. 9 is provided merely as an example. Other examples are possible and may differ from what was described with regard to FIG. 9.

Implementations described herein may allow a message server to transmit information, identifying an action being performed using a client device, to another client device via an IMAP IDLE session.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriate secure manner reflective of the type of information, for example, through various encryption and anonymization techniques for particularly sensitive information. No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
      establish an internet message access protocol (IMAP) IDLE session with a first client device,
         the IMAP IDLE session being used to transmit one or more notifications to the first client device;
      determine an IMAP XTYPE command including a first status notification, of an electronic message, associated with a second client device,
         the first status notification including information associated with an action being performed using the second client device,
            the action including an indication that the second client device is being used to type content of the electronic message;
      determine that the first client device is an intended recipient of the first status notification; and
      transmit the first status notification, toward the first client device, via the IMAP IDLE session, based on determining that the first client device is the intended recipient of the first status notification.

2. The device of claim 1, where the one or more processors are further to:
   receive the IMAP XTYPE command from the second client device; and
   the one or more processors, when determining the IMAP XTYPE command, are to:
      determine the IMAP XTYPE command based on receiving the IMAP XTYPE command.

3. The device of claim 1, where the one or more processors are further to:
   determine an idle time associated with the second client device being used to type the content of the electronic message; and
   generate a second IMAP XTYPE command,
      the second IMAP XTYPE command including information indicating the idle time associated with the second client device being used to type the content of the electronic message; and
   where the one or more processors, when transmitting the first status notification, are to:
      transmit the second IMAP XTYPE command to the first client device via the IMAP IDLE session.

4. The device of claim 1, where the one or more processors are further to:
   determine a second status notification associated with the second client device;
   determine, based on determining the second status notification is associated with the second client device, that the second client device is uploading data to be downloaded by the first client device;
   generate a second IMAP XTYPE command,
      the second IMAP XTYPE command including the second status notification indicating that the second client device is uploading the data to be downloaded by the first client device; and
   transmit the second IMAP XTYPE command to the first client device via the IMAP IDLE session.

5. The device of claim 1, where the one or more processors, when determining that the first client device is the intended recipient of the first status notification, are to:
   determine a plurality of intended recipients for the first status notification,
      the plurality of intended recipients including the first client device; and
   determine a plurality of IMAP IDLE sessions associated with the plurality of intended recipients,
      the plurality of IMAP IDLE sessions including the IMAP IDLE session; and
   where the one or more processors, when transmitting the first status notification, are to:
      transmit the first status notification to the plurality of intended recipients via the plurality of IMAP IDLE sessions.

6. The device of claim 1, where the one or more processors are further to:
   determine one or more acceptable status notification types permitted to be received by the first client device; and
   determine that a status notification type, of the first status notification, matches an acceptable status notification type of the one or more acceptable status notification types; and
   where the one or more processors, when transmitting the first status notification, are to:
      transmit the first status notification to the first client device based on determining that the status notification type matches the acceptable status notification type.

7. The device of claim 1, where the one or more processors are further to:
  determine one or more client devices from which the first client device may accept one or more status notifications; and
  identify the second client device as one of the one or more client devices from which the first client device may accept the one or more status notifications; and
  where the one or more processors, when transmitting the first status notification, are to:
    transmit the first status notification based on identifying the second client device as one of the one or more client devices from which the first client device may accept the one or more status notifications.

8. The device of claim 1, where the one or more processors are further to:
  determine a second status notification associated with the second client device,
    where the second status notification includes at least one of:
      an indication that the second client device is being used to upload data;
      an indication that the second client device is being used to take a photograph;
      an indication that the second client device is being used to record a video; or
      an indication that the second client device is being used to record audio.

9. A method, comprising:
  establishing, by a network device, an interne message access protocol (IMAP) IDLE session with a first client device,
    the IMAP IDLE session being used to transmit one or more notifications to the first client device;
  receiving, by the network device, an IMAP XTYPE command including a first status notification, of an electronic message, associated with a second client device,
    the first status notification including information associated with an action being performed at the second client device
      the action including an indication that the second client device is being used to type content of the electronic message;
  determining, by the network device, that the first client device is an intended recipient of the first status notification; and
  causing, by the network device, the first status notification to be transmitted to the first client device, via the IMAP IDLE session, based on determining that the first client device is the intended recipient of the first status notification.

10. The method of claim 9, where determining that the first client device is the intended recipient of the first status notification comprises:
  determining a plurality of intended recipients for the first status notification,
    the plurality of intended recipients including the first client device; and
  determining a plurality of I MAP IDLE sessions associated with the plurality of intended recipients,
    the plurality of IMAP IDLE sessions including the IMAP IDLE session; and
  where transmitting the first status notification comprises:
    transmitting the first status notification to the plurality of intended recipients via the plurality of IMAP IDLE sessions.

11. The method of claim 9, further comprising:
  determining one or more acceptable status notification types permitted to be received by the first client device; and
  determining that a status notification type, of the first status notification, matches an acceptable status notification type of the one or more acceptable status notification types; and
  where transmitting the first status notification comprises:
    transmitting the first status notification to the first client device based on determining that the status notification type matches the acceptable status notification type.

12. The method of claim 9, further comprising:
  determining one or more client devices from which the first client device may accept one or more status notifications; and
  identifying the second client device as one of the one or more client devices from which the first client device may accept the one or more status notifications; and
  where transmitting the first status notification, comprises:
    transmitting the first status notification based on identifying the second client device as one of the one or more client devices from which the first client device may accept the one or more status notifications.

13. The method of claim 9, further comprising:
  receiving a second status notification associated with the second client device,
    the second status notification including at least one of:
      an indication that the second client device is being used to upload data;
      an indication that the second client device is being used to take a photograph;
      an indication that the second client device is being used to record a video; or
      an indication that the second client device is being used to record audio.

14. A non-transitory computer readable medium storing instructions, the instructions comprising:
  one or more instructions that, when executed by one or more processors, cause the one or more processors to:
    establish an internet message access protocol (IMAP) IDLE session with a first client device,
      the IMAP IDLE session being used to transmit one or more notifications to the first client device;
    generate an IMAP XTYPE command including a first status notification, of an electronic message, associated with a second client device,
      the first status notification identifying an action being performed at the second client device
        the action including an indication that the second client device is being used to type content of the electronic message;
    determine that the first client device is an intended recipient of the first status notification; and
    transmit the first status notification, for display by the first client device, via the IMAP IDLE session, based on determining that the first client device is the intended recipient of the first status notification.

15. The non-transitory computer readable medium of claim 14, where the one or more instructions, when executed by the one or more processors, further cause the one or more processors to:
  determine an idle time associated with the first status notification, the idle time identifying a period of time after which the first client device is to remove display of the first status notification; and where the one or more instructions, that cause the one or more processors to transmit the first status notification, cause the one or more processors to:

transmit information that identifies the idle time to the first client device.

16. The non-transitory computer readable medium of claim 14, where the one or more instructions, when executed by the one or more processors, further cause the one or more processors to:

determine an idle time associated with the second client device being used to type the content of the electronic message;

generate a second IMAP XTYPE command,
the second IMAP XTYPE command including information indicating the idle time associated with the second client device being used to type the electronic message; and transmit the second IMAP XTYPE command to the first client device via the IMAP IDLE session.

17. The non-transitory computer readable medium of claim 14, where the one or more instructions, when executed by the one or more processors, further cause the one or more processors to:

determine that the second client device is being used to upload a file,
the file being associated with a message to be sent to the first client device;

generate the a second status notification,
the second status notification indicating that the second client device is being used to upload the file; and transmit the second status notification to the first client device via the IMAP IDLE session.

18. The non-transitory computer readable medium of claim 14, where the one or more instructions, when executed by the one or more processors, further cause the one or more processors to:

determine an acceptable status notification type permitted to be received by the first client device; and compare a status notification type, of the first status notification, and the acceptable status notification type; and where the one or more instructions, that cause the one or more processors to transmit the first status notification, cause the one or more processors to:

transmit the first status notification toward the first client device based on comparing the status notification type and the acceptable status notification type.

19. The non-transitory computer readable medium of claim 14, where the one or more instructions, when executed by the one or more processors, further cause the one or more processors to:

determine one or more client devices from which the first client device may accept one or more status notifications; and identify the second client device as one of the one or more client devices from which the first client device may accept the one or more status notifications; and where the one or more instructions, that cause the one or more processors to transmit the first status notification, cause the one or more processors to:

transmit the first status notification based on identifying the second client device as one of the one or more client devices from which the first client device may accept the one or more status notifications.

20. The non-transitory computer readable medium of claim 14, where the one or more instructions, when executed by the one or more processors, further cause the one or more processors to:

generate a second status notification associated with the second client device,
the second status notification including at least one of:
an indication that the second client device is being used to upload data;
an indication that the second client device is being used to take a photograph;
an indication that the second client device is being used to record a video; or
an indication that the second client device is being used to record audio.

* * * * *